US006906756B1

(12) United States Patent
Kubota et al.

(10) Patent No.: US 6,906,756 B1
(45) Date of Patent: Jun. 14, 2005

(54) DISPLAY AND VIDEO PRODUCING APPARATUS, AND DISPLAYING METHOD AND VIDEO PRODUCING METHOD

(75) Inventors: Kosuke Kubota, Yokosuka (JP); Yutaka Machida, Yokohama (JP); Motoya Miyauchi, Suginami-ku (JP); Tadashi Kayada, Yokohama (JP); Takeshi Yukitake, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 564 days.

(21) Appl. No.: 09/869,279

(22) PCT Filed: Oct. 27, 2000

(86) PCT No.: PCT/JP00/07535

§ 371 (c)(1), (2), (4) Date: Jun. 27, 2001

(87) PCT Pub. No.: WO01/33538

PCT Pub. Date: May 10, 2001

(30) Foreign Application Priority Data

Oct. 29, 1999 (JP) .......................................... 11-310111

(51) Int. Cl.[7] ............................ H04N 3/27; H04N 5/46

(52) U.S. Cl. ....................... 348/554; 348/555; 348/556; 345/698

(58) Field of Search ................................ 348/554, 555, 348/576, 577, 580, 511, 714, 718, 719, 715; 345/590, 574, 534, 501, 530, 531, 568

(56) References Cited

U.S. PATENT DOCUMENTS 4,197,590 A 4/1980 Sukonick et al.

(Continued)

FOREIGN PATENT DOCUMENTS

| | | |
|---|---|---|
| JP | 07129138 | 5/1995 |
| JP | 07234773 | 9/1995 |
| JP | 07255026 | 10/1995 |

(Continued)

OTHER PUBLICATIONS

PCT International Search Report dated Feb. 6, 2001.

*Primary Examiner*—Michael H. Lee
(74) *Attorney, Agent, or Firm*—Stevens, Davis, Miller & Mosher, LLP

(57) ABSTRACT

A vertical region designation circuit 141 outputs a vertical region designation signal to a vertical driver 103 on the basis of vertical display position information, a vertical synchronization signal and a horizontal synchronization signal. A horizontal region designation circuit 142 outputs a horizontal region designation signal to a horizontal driver 102 on the basis of horizontal display position information, a pixel synchronization signal, a vertical synchronization signal and a horizontal synchronization signal. The horizontal driver 102 outputs an input picture signal to a picture display surface 101 from a signal line at a horizontal coordinate corresponding to the number of times of pixel synchronization signals that is counted from an input horizontal synchronization signal as a starting point during a period when a horizontal region designation signal is effective. A vertical driver 103 stores the number of times of synchronization of a horizontal synchronization signal during a period when a vertical region designation signal is effective, and the vertical driver 103 selects a signal line at a vertical coordinate corresponding to the number of times of synchronization. The picture display surface 101 displays a picture signal output from the horizontal driver 102 at a position designated by a horizontal coordinate corresponding to the signal line where the picture signal was output and a vertical coordinate corresponding to the signal line selected by the vertical driver 103.

5 Claims, 10 Drawing Sheets

U.S. PATENT DOCUMENTS

| | | | | | |
|---|---|---|---|---|---|
| 4,533,910 | A | | 8/1985 | Sukonick et al. | |
| 4,642,790 | A | | 2/1987 | Minshull et al. | |
| 4,779,084 | A | * | 10/1988 | Tanaka et al. | 345/574 |
| 5,257,348 | A | | 10/1993 | Roskowski et al. | |
| 5,555,002 | A | * | 9/1996 | Nguyen | 345/590 |
| 5,572,259 | A | | 11/1996 | Nohara | |
| 5,818,417 | A | * | 10/1998 | Mattison | 345/24 |
| 5,920,327 | A | | 7/1999 | Seidensticker, Jr. | |
| 5,943,065 | A | | 8/1999 | Yassaie et al. | |
| 6,256,061 | B1 | * | 7/2001 | Martin et al. | 348/222.1 |

FOREIGN PATENT DOCUMENTS

| | | |
|---|---|---|
| JP | 08065608 | 3/1996 |
| JP | 08087249 | 4/1996 |
| JP | 08287270 | 11/1996 |
| JP | 9146522 | 6/1997 |
| JP | 9198021 | 7/1997 |
| JP | 10274974 | 10/1998 |
| JP | 11015630 | 1/1999 |
| JP | 11085119 | 3/1999 |
| JP | 11288257 | 10/1999 |
| JP | 11305746 | 11/1999 |

* cited by examiner

DISPLAY AND VIDEO PRODUCING APPARATUS, AND DISPLAYING METHOD AND VIDEO PRODUCING METHOD

TECHNICAL FIELD

The present invention relates to a display apparatus, a picture generation apparatus, a display method and a picture generation method, and more particularly to a display apparatus, a picture generation apparatus, a display method and a picture generation method, all being suitable for being used in radio communication.

BACKGROUND ART

Generally, a display apparatus such as a television receiver and a liquid crystal panel receives a picture signal of a predetermined resolution at predetermined timing to display a picture.

On the other hand, a cathode ray tube or the like the fluorescence screen of which is irradiated with an electron beam is used as a display to be used in a computer or the like, and such a display sometimes performs displaying corresponding to picture signals of various resolutions. These displays severally comprise a circuit for executing the mode determination of an input picture signal by determining the frequencies of a horizontal synchronization signal and a vertical synchronization signal, and a signal generation circuit for driving the display correspondingly to the determined mode, and thereby the displays can perform displaying corresponding to picture signals of a plurality of resolutions.

However, because the resolution of a display apparatus using a liquid crystal panel is fixed to be a definite value since its display pixel number is fixed, it is impossible for the display apparatus to change the resolution by changing the frequencies of a horizontal synchronization signal and a vertical synchronization signal, and it is difficult for the display apparatus to display pictures in various resolutions.

A method for resolving the problem is proposed in Japanese Laid-Open Publication No. HEI 8-87249. The model disclosed in the Japanese Laid-Open Publication No. HEI 8-87249 obtains the frequency mode of an input horizontal synchronization frequency or an input vertical synchronization frequency to set a display starting position corresponding to the obtained frequency mode, and thereby the model displays picture data having resolutions different from the resolution of the liquid crystal panel thereof.

On the other hand, in the mobile communication system that is directed to pictorial communication, a demand for a mobile terminal device and a mobile station device, both having a mobile visual telephone function, has been increasing with a tendency toward multimedia in recent years. In such a mobile terminal device, it is certain that the moving picture expert group 4 (MPEG-4) being an international standard of a moving picture coding system will widely be adopted.

Because the MPEG-4 can code pictures having arbitrary resolutions for the transmission of them, it is necessary for a mobile telephone or the like, which performs pictorial communication in conformity with the MPEG-4, to display pictures of various resolutions.

However, the conventional apparatus has a problem such that the apparatus cannot display picture data having a resolution other than predetermined several kinds of resolutions.

Moreover, the apparatus has another problem such that the apparatus cannot display picture data having a size larger than the display size of the display apparatus.

DISCLOSURE OF INVENTION

A first object of the present invention is to provide a display apparatus, a picture generation apparatus, a display method and a picture generation method, all being capable of displaying picture data of an arbitrary resolution.

A second object of the present invention is to provide a display apparatus, a picture generation apparatus, a display method and a picture generation method, all being capable of displaying picture data having a size larger than the display size of the display apparatus.

These objects is compassed by the reception of input picture data only within a display sphere and by the displaying of the received data, and more minutely, by the distinction between the picture data to be displayed and the picture data not to be displayed by means of the counting of the number of pieces of synchronization of a synchronization signal at the time of the input of the picture data.

BEST MODE FOR CARRYING OUT THE INVENTION

Hereinafter, preferred embodiments of the present invention are described by means of the attached drawings.

(EMBODIMENT 1)

Figure 1:
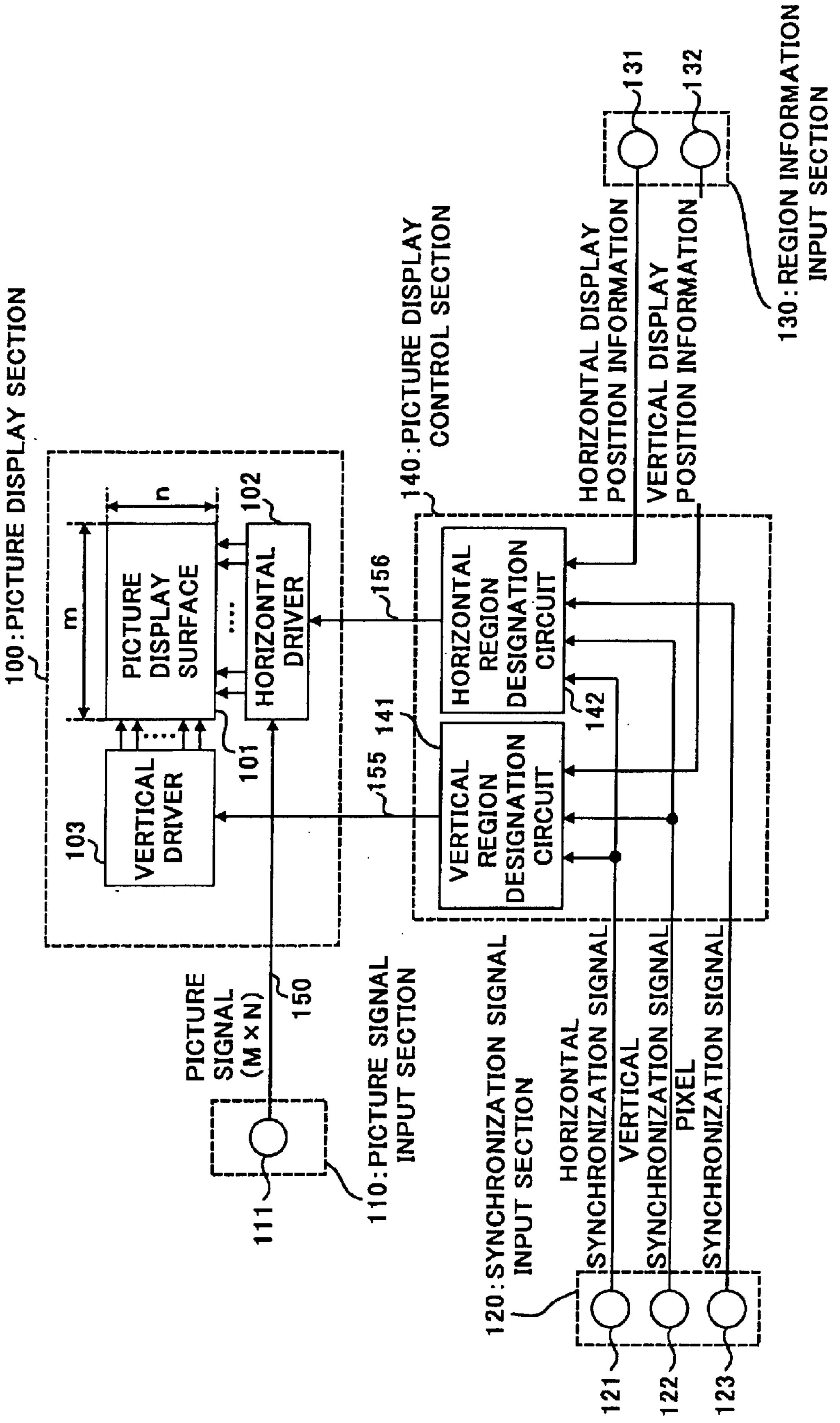
FIG. 1 is a block diagram showing the configuration of a display apparatus according to Embodiment 1 of the present invention.

FIG. 1 is a block diagram showing the configuration of a display apparatus according to Embodiment 1 of the present invention. In FIG. 1, the display apparatus of Embodiment 1 is chiefly composed of a picture display section 100, a picture signal input section 110, a synchronization signal input section 120, a region information input section 130 and a picture display control section 140.

The picture display section 100 is chiefly composed of a picture display surface 101, a horizontal driver 102 and a vertical driver 103. In addition, the picture display control section 140 chiefly comprises a vertical region designation circuit 141 and a horizontal region designation circuit 142.

Moreover, the picture signal input section 110 has a picture signal input terminal 111. Besides, the synchronization signal input section 120 has a horizontal synchronization signal input terminal 121, a vertical synchronization signal input terminal 122 and a pixel synchronization signal input terminal 123. Furthermore, the region information input section 130 has a horizontal region input terminal 131 and a vertical region input terminal 132.

In the example of the present embodiment, the description is given to a case where a picture signal having the resolutions of "M" in the horizontal direction and "N" in the vertical direction is input into the display apparatus and the picture signal is displayed in the resolutions of "m" in the horizontal direction and "n" in the vertical direction where $m<M$ and $n<N$.

The vertical region input terminal 132 inputs vertical display position information indicating the minimum coordinate and the maximum coordinate of the display sphere in the vertical direction from the outside, and the terminal 132 outputs the input vertical display position information to the vertical region designation circuit 141.

The vertical region designation circuit 141 outputs a vertical region designation signal to the vertical driver 103 on the basis of the vertical display position information input from the vertical region input terminal 132 and a vertical synchronization signal and a horizontal synchronization signal, both being input from the synchronization signal input section 120.

To put it concretely, the vertical region designation circuit 141 counts the number of pieces of synchronization of a horizontal synchronization signal input from the synchronization signal input section 120. After the number of pieces of vertical synchronization becomes the same as the minimum coordinate of the display sphere in which the vertical display position information is included, the vertical region designation circuit 141 makes the vertical region designation signal effective. After the number of pieces of vertical synchronization becomes the same as the maximum coordinate of the display sphere to which the vertical display position information is included, the vertical region designation circuit 141 makes the vertical region designation signal noneffective.

In addition, the vertical region designation circuit 141 counts the number of pieces of synchronization of the horizontal synchronization signal input from the synchronization signal input section 120, and after the number of pieces of synchronization becomes the same as the maximum value of the vertical coordinates of an input picture signal, the vertical region designation circuit 141 sets the number of pieces of synchronization to the minimum value of the horizontal coordinates of the input picture signal to start to count the number of pieces of synchronization again.

The horizontal region input terminal 131 outputs horizontal display position information input from the outside to the horizontal region designation circuit 142. Incidentally, the horizontal display position information indicates the minimum coordinate and the maximum coordinate of the display sphere of the horizontal direction.

The horizontal region designation circuit 142 outputs a horizontal region designation signal to the horizontal driver 102 on the basis of the horizontal display position information input from the horizontal region input terminal 131 and a horizontal synchronization signal and a pixel synchronization signal, both being input from the synchronization signal input section 120.

To put it concretely, the horizontal region designation circuit 142 counts the number of pieces of synchronization of a pixel synchronization signal input from the synchronization signal input section 120. After the number of pieces of horizontal synchronization becomes the same as the minimum coordinate of the display sphere in which the horizontal display position information is included, the horizontal region designation circuit 142 makes the horizontal region designation signal effective. After the number of pieces of horizontal synchronization becomes the same as the maximum coordinate of the display sphere to which the horizontal display position information is included, the horizontal region designation circuit 142 makes the horizontal region designation signal noneffective.

In addition, the horizontal region designation circuit 142 counts the number of pieces of synchronization of the pixel synchronization signal input from the synchronization signal input section 120, and after the number of pieces of horizontal synchronization becomes the same as the maximum value of the horizontal coordinates of the input picture signal, the horizontal region designation circuit 142 sets the number of pieces of horizontal synchronization to the minimum value of the horizontal coordinates of the input picture signal.

When the horizontal region designation signal output from the horizontal region designation circuit 142 becomes effective, the horizontal driver 102 outputs a picture signal output from the picture signal input section 110 to the picture display surface 101.

To put it concretely, the horizontal driver 102 is connected with the picture display surface 101 with the maximum horizontal pixel number "m" of signal lines, and the horizontal driver 102 is connected with the picture display surface 101 in a state in which the horizontal coordinates of the picture display surface 101 correspond to the signal lines in one-to-one correspondence. The horizontal driver 102 stores picture signals during a period when a horizontal region designation signal output from the horizontal region designation circuit 142 is effective, and the horizontal driver 102 outputs the stored picture signals simultaneously to the picture display surface 101 from the signal lines in a relation of one-to-one correspondence with the horizontal coordinates corresponding to the number of times of the pixel synchronization signals counted from a horizontal synchronization signal as a starting point.

The horizontal driver 102 updates a stored picture signal with a newly input picture signal at a period of a horizontal synchronization signal.

The vertical driver 103 stores the number of times of synchronization of a horizontal synchronization signal during a period when a vertical region designation signal output from the vertical region designation circuit 141 is effective, and the vertical driver 103 selects a signal line of a vertical coordinate corresponding to the number of synchronization times. The vertical driver 103 selects a vertical coordinate of the picture display surface 101 in order at the period of a horizontal synchronization signal during the vertical region designation signal output from the vertical region designation circuit 141 is effective. In addition, when the number of times of synchronization becomes larger than the maximum value of the vertical coordinates, the vertical driver 103 sets the number of times of synchronization as the minimum value of the vertical coordinates.

The picture display surface 101 displays a picture signal output from the horizontal driver 102 at a position designated by a horizontal coordinate corresponding to a signal line where the picture signal was output and a vertical coordinate corresponding to a signal line selected by the vertical driver 103.

The picture display surface 101 performs the display of the resolution of m×n, and displays a picture signal output from the horizontal driver 102 at a position designated by a horizontal coordinate corresponding to a signal line on which the picture signal was output and a vertical coordinate output from the vertical driver 103.

Next, signal timing in the display apparatus of Embodiment 1 is described.

Figure 2:
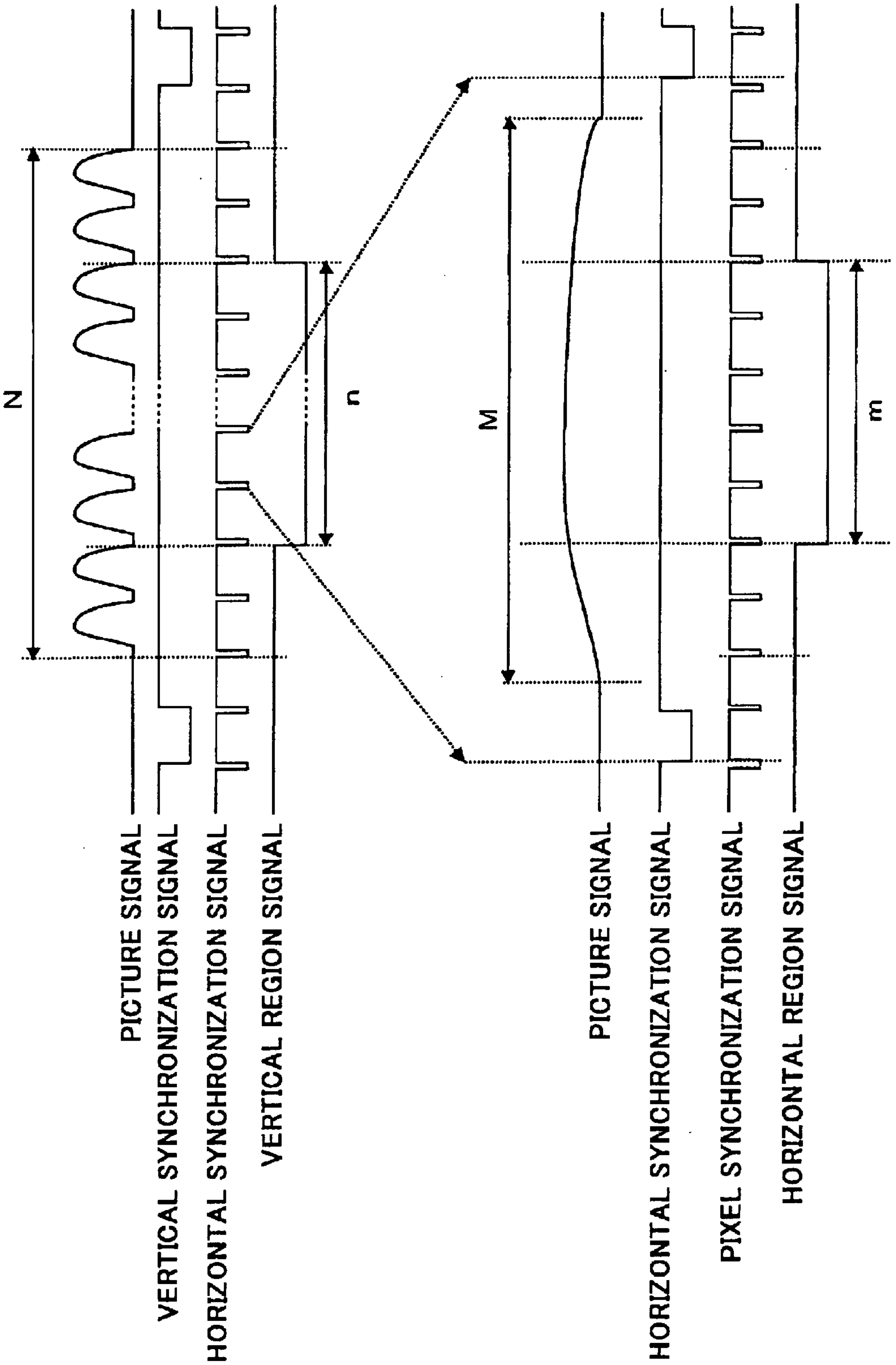
FIG. 2 is a diagram showing an example of signal timing of the display apparatus according to the aforesaid Embodiment.

FIG. 2 is a diagram showing an example of signal timing of the display apparatus according to the present embodiment. The abscissa axis in FIG. 2 indicates time.

A horizontal synchronization signal input from the horizontal synchronization signal input terminal 121 is a signal giving a pulse having a fixed width at every input of a picture signal for one line of a picture signal, and the horizontal synchronization signal becomes effective for a period of time for the output of the picture signal for "M" pixels in the horizontal direction. In addition, a vertical synchronization signal input from the vertical synchronization signal input terminal 122 is a signal giving a pulse having a fixed width at every input of a picture signal for one frame of a picture signal, and the vertical synchronization signal becomes effective for a period of time for the output of the "N" lines of the picture signal for "M" pixels in the horizontal direction.

The picture signal is output from the picture signal input section 110 to the horizontal driver 102 for the period when the horizontal synchronization signal is effective. As a result, a picture signal for "M" pixels in the horizontal direction is output.

In the picture signal for "M" pixels, the picture signal for the period when the horizontal region designation signal is effective is output from the horizontal driver 102 to the picture display surface 101, and the picture signal for the period when the horizontal region designation signal is noneffective is not output from the horizontal driver 102 to the picture display surface 101. As a result, a picture signal for "m" pixels is output from the horizontal driver 102 to the picture display surface 101.

In a picture signal output from the horizontal driver 102, a picture signal output in the period when the vertical region designation signal is effective is displayed on the picture display surface 101, and a picture signal output in the period when the vertical region designation signal is noneffective is not displayed on the picture display surface 101.

As described above, the display apparatus of the present embodiment counts the number of the pixels of an input picture signal to correlate the counted number with coordinates, and the display apparatus extracts only a part of the coordinates that is to be displayed. Thereby, the display apparatus can display only a part of the input picture signal that can be displayed. Consequently, the display apparatus can perform the display of a picture with a resolution different from that of the input picture signal.

Incidentally, if the input picture data do not exceed the display ability of the display apparatus, namely the display sphere, the display apparatus of the present embodiment can display the input picture data as they are. And, when picture data exceeding the display ability are input, the display apparatus of the present embodiment can extract the data in a sphere where the data can be displayed to display them.

Moreover, although the vertical region designation signal and the horizontal region designation signal are made to be always effective during the period of time when the picture signal displayed on the picture display surface 101 is input in Embodiment 1, it may be adopted that the vertical region designation signal and the horizontal region designation signal are made to be effective only at the timing when the picture signal at the forefront coordinate to be displayed is input.

Figure 3:
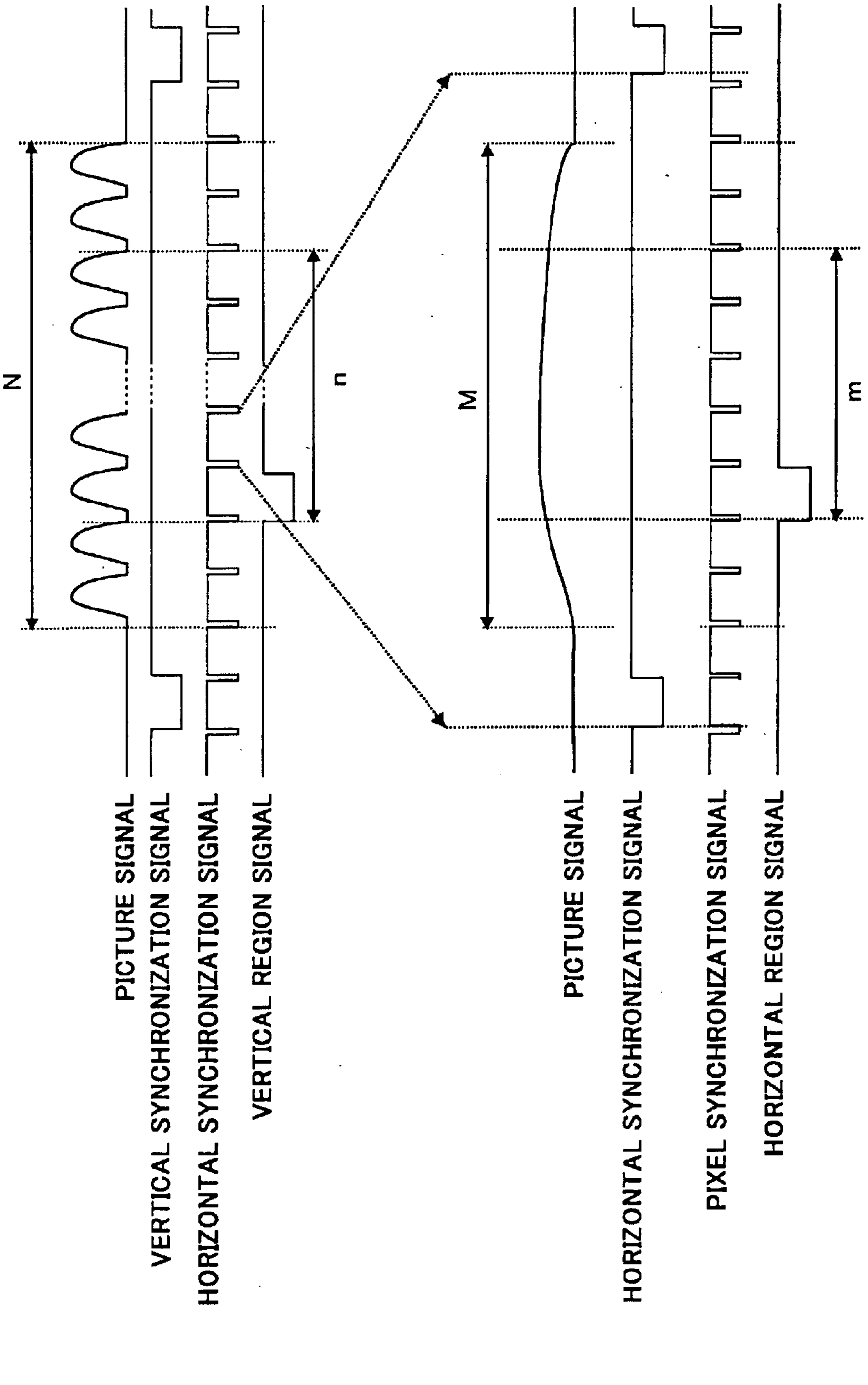
FIG. 3 is a diagram showing an example of signal timing of the display apparatus according to the aforesaid Embodiment.

In this case, as shown in FIG. 3, the horizontal driver 102 takes in "m" pixels of a picture signal after the horizontal region designation signal became effective, and then, the horizontal driver 102 does not take in any picture signal until the horizontal region designation signal becomes effective next time. In addition, the vertical driver 103 outputs vertical coordinates for "N" lines to the picture display surface 101 after the vertical region designation signal became effective. After that, the vertical driver 103 does not output any vertical coordinate until the vertical region designation signal becomes effective next.

The adoption of such a configuration makes the pieces of information necessary for designation decrease.

Moreover, the region information input section 130 is composed of the vertical region input terminal 132 and the horizontal region input terminal 131, and the horizontal display position information and the vertical display position information are separately input, but, the configuration of the region information input section 130 is not limited to such a configuration. That is, the region information input section 130 may be configured with an information input terminal of one system, and a piece of code information including both of the horizontal display position information and the vertical display position information may be adopted.

The adoption of such a configuration makes necessary lines decrease.

Besides, the vertical region designation circuit 141 may be configured such that it autonomously generates a vertical region designation signal only by means of a vertical synchronization signal and a horizontal synchronization signal without using the vertical display position information input from the vertical region input terminal 132. In this case, instead of supplying the vertical display position information in the region information input section 130 to the vertical region designation circuit 141, the vertical coordinates of a region stored beforehand in the vertical region designation circuit 141 is output to the vertical driver 103.

The adoption of such a configuration makes it possible to display a picture without necessity of the designation of the vertical display position information from the outside.

Moreover, the horizontal region designation circuit 142 may be configured such that it autonomously generates a horizontal region designation signal only by means of a vertical synchronization signal and a horizontal synchronization signal without using the horizontal display position information input from the horizontal region input terminal 131. In this case, instead of supplying the horizontal display position information in the region information input section 130 to the horizontal region designation circuit 142, only the picture signals in a region stored beforehand in the horizontal region designation circuit 142 is output to the picture display surface 101 from the horizontal driver 102.

The adoption of such a configuration makes it possible to display a picture without necessity of the designation of the horizontal display position information from the outside.

Moreover, it is also possible to change the position of a region designated by the vertical region designation signal generated by the vertical region designation circuit 141 at every frame continuously. In this case, a configuration such that the quantity of the change of a region position at every frame is also input into the vertical region designation circuit 141 from the region information input section 130 is adopted. The adoption of such a configuration makes it possible to scroll a picture displayed on the basis of a picture signal in a region equivalent to the resolution of the picture display surface 101 in the picture signal in the vertical direction.

Moreover, the position of a region designated by the horizontal region designation signal generated by the horizontal region designation circuit 142 can also be changed at every frame continuously. In this case, a configuration such that the quantity of the change of a region position at every frame is input into the horizontal region designation circuit 142 from the region information input section 130 is adopted. The adoption of such a configuration makes it possible to scroll a picture displayed on the basis of a picture signal in a region equivalent to the resolution of the picture display surface 101 in the picture signal in the horizontal direction.

(EMBODIMENT 2)

Figure 4:
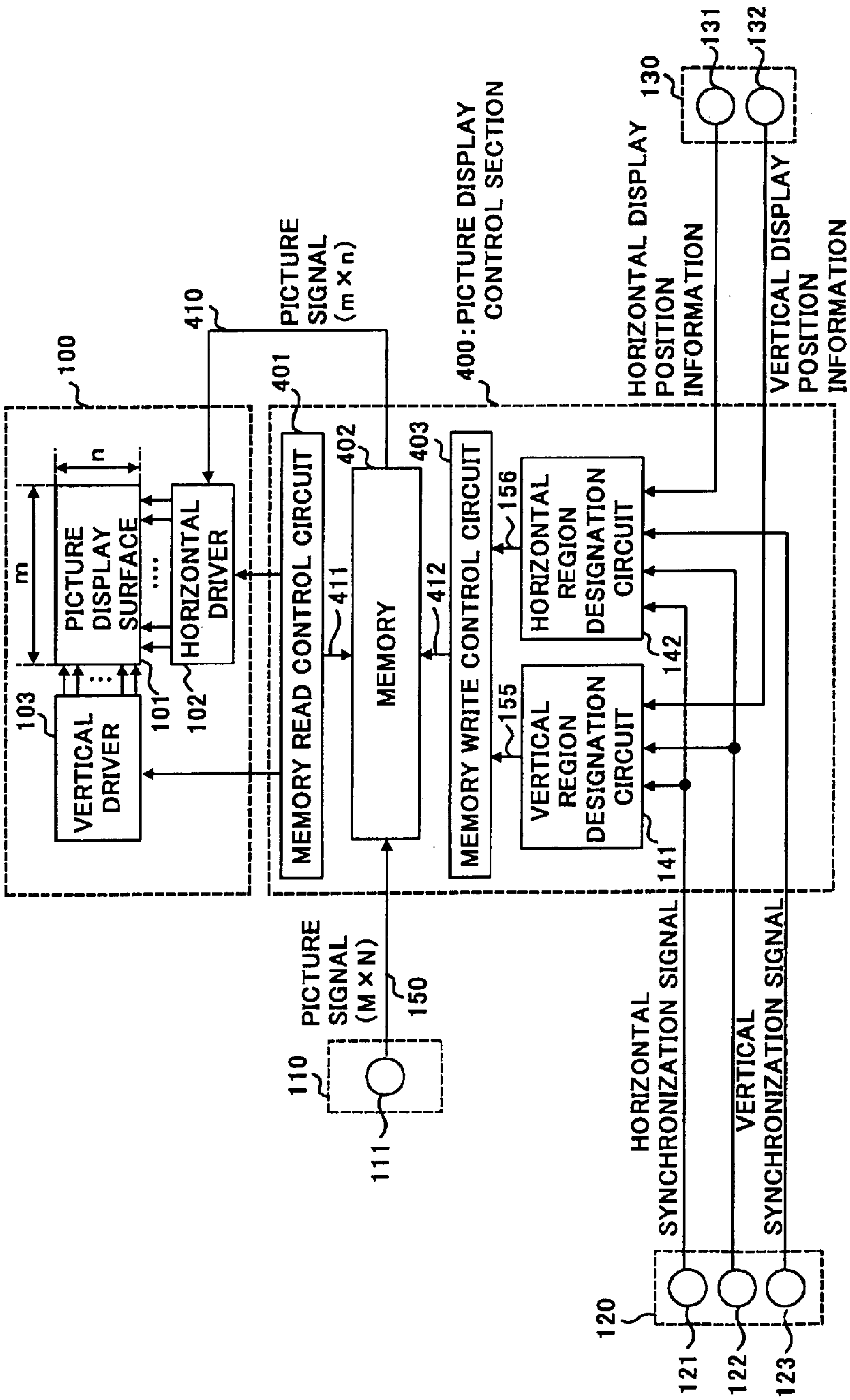
FIG. 4 is a block diagram showing the configuration of a display apparatus according to Embodiment 2 of the present invention.

FIG. 4 is a block diagram showing the configuration of a display apparatus according to Embodiment 2 of the present invention. Incidentally, the elements having the same configurations as those of the elements shown in FIG. 1 are designated by the same reference numerals as those of FIG. 1, and the detailed descriptions concerning them are omitted.

In FIG. 4, the display apparatus according to Embodiment 2 is different from the display apparatus according to Embodiment 1 in the following: Embodiment 2 comprises a picture display control section 400, and Embodiment 2 outputs a memorized picture signal when no picture signal is input from the outside.

The picture display control section 400 is chiefly composed of a memory read control circuit 401, a memory 402 and a memory write control circuit 403.

In the example of the present embodiment, the description is given to a case where a picture signal having the resolutions of "M" in the horizontal direction and "N" in the vertical direction is input into the display apparatus and the picture signal is displayed in the resolutions of "m" in the horizontal direction and "n" in the vertical direction where $m<M$ and $n<N$.

The vertical region designation circuit 141 outputs a vertical region designation signal to the memory write control circuit 403 on the basis of the vertical display position information input from the vertical region input terminal 132 and a vertical synchronization signal and a horizontal synchronization signal, both being input from the synchronization signal input section 120.

The horizontal region designation circuit 142 outputs a horizontal region designation signal to the memory write control circuit 403 on the basis of the horizontal display position information input from the horizontal region input terminal 131 and a vertical synchronization signal and a horizontal synchronization signal, both being input from the synchronization signal input section 120.

The memory write control circuit 403 outputs a memory write signal to the memory 402 during a period of time when the vertical region designation signal and the horizontal region designation signal are effective.

The memory 402 stores a picture signal output from the picture signal input section 110 in conformity with the memory write signal output from the memory write control circuit 403. By this operation, the memory 402 can store a picture signal of the number of pixels of $m \times n$ in a picture signal of the resolution of $M \times N$ that was input into the picture signal input section 110.

The memory read control circuit 401 outputs a memory read signal to memory 402 to read a picture signal of the resolution of $m \times n$ stored in the memory 402, and the memory read control circuit 401 outputs the read picture signal to the horizontal driver 102.

The horizontal driver 102 outputs the picture signal output from the memory 402 to the picture display surface 101.

The vertical driver 103 stores the number of times of synchronization of a horizontal synchronization signal, and outputs the number of times of synchronization as a vertical coordinate to the picture display surface 101.

When the input of a picture signal from the outside stopped, no new picture signal is stored in the memory 402. But, a picture signal stored in the memory 402 is output to the horizontal driver 102, and then the output picture signal is output to the picture display surface 101.

Next, signal timing in the display apparatus of Embodiment 2 is described.

Figure 5:
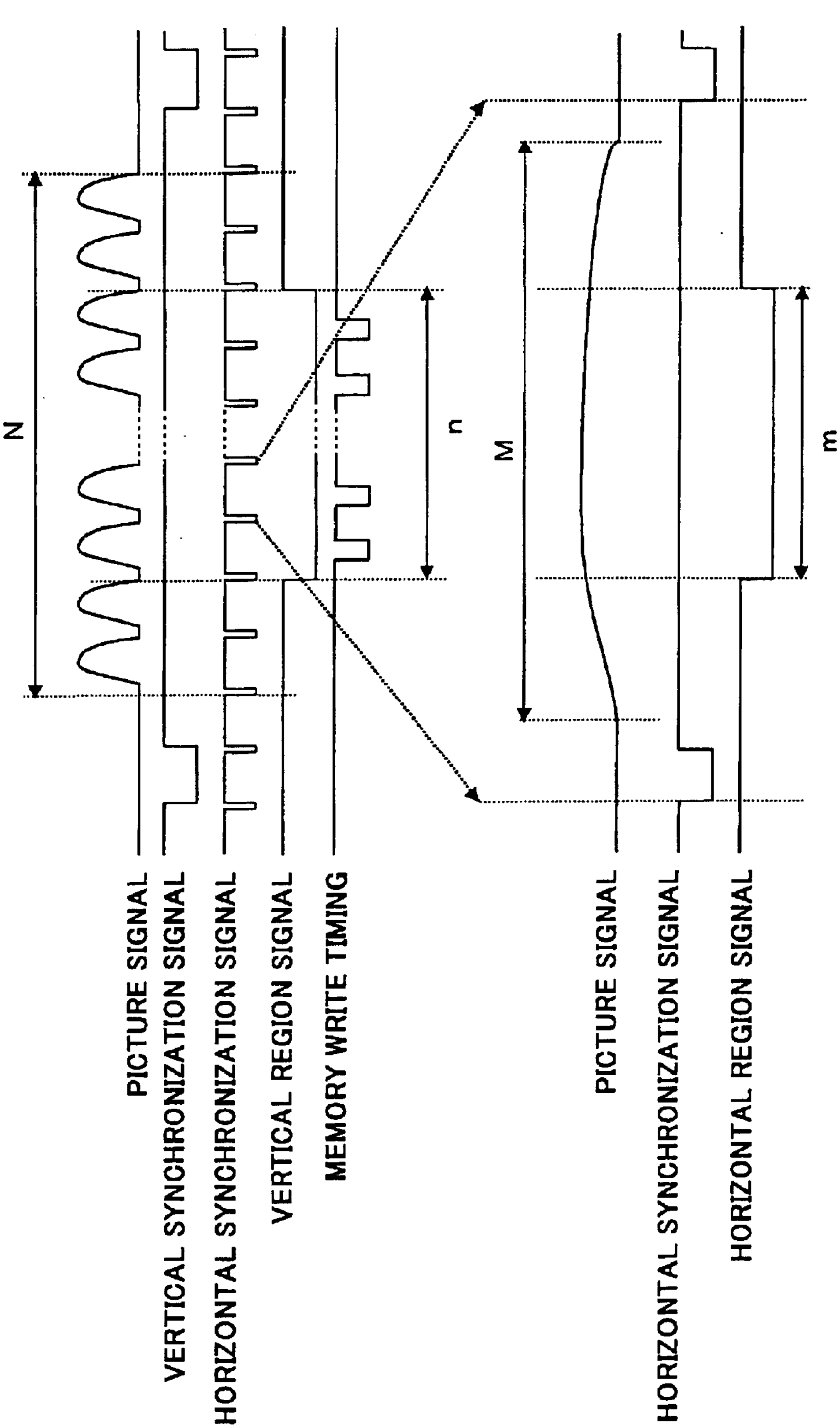
FIG. 5 is a diagram showing an example of signal timing of the display apparatus according to the aforesaid Embodiment.

FIG. 5 is a diagram showing an example of signal timing of the display apparatus according to the present embodiment. The abscissa axis in FIG. 5 indicates time.

A horizontal synchronization signal input from the horizontal synchronization signal input terminal 121 is a signal giving a pulse having a fixed width at every input of a picture signal for one line of a picture signal, and the horizontal synchronization signal becomes effective for a period of time for the output of the picture signal for "M" pixels in the horizontal direction. In addition, a vertical synchronization signal input from the vertical synchronization signal input terminal 122 is a signal giving a pulse having a fixed width at every input of a picture signal for one frame of a picture signal, and the vertical synchronization signal becomes effective for a period of time for the output of the "N" lines of the picture signal for "M" pixels in the horizontal direction.

The picture signal is output from the picture signal input section 110 to the memory 402 for the period when the horizontal synchronization signal is effective. As a result, a picture signal for "M" pixels in the horizontal direction is output.

In the picture signal for "M" pixels, a picture signal for the period when the horizontal region designation signal is effective is stored in the memory 402, and a picture signal for the period when the horizontal region designation signal is noneffective is not stored in the memory 402. As a result, a picture signal for "m" pixels is stored in the memory 402.

In addition, because a memory write timing signal is output during a period when the vertical region signal is effective, a picture signal for "n" lines in a picture signal for "N" lines in the vertical direction is written in the memory 402.

As described above, the display apparatus of the present embodiment counts the number of the pixels of an input picture signal to correlate the counted number with coordinates, and the display apparatus extracts only a part of the coordinates that is to be displayed. Thereby, the display apparatus can display only a part of the input picture signal that can be displayed. Consequently, the display apparatus can perform the display of a picture with a resolution different from that of the input picture signal.

In addition, the display apparatus of the present embodiment memorizes a picture signal input from the outside, and thereby the display apparatus can display the memorized picture signal when no picture signal is input from the outside. Hence, the display apparatus can display a picture by itself.

Incidentally, although the vertical region designation signal and the horizontal region designation signal are made to be always effective during the period of time when the picture signal to be displayed on the picture display surface 101 is input in Embodiment 2, it may be adopted that the vertical region designation signal and the horizontal region designation signal are made to be effective only at the timing when the picture signal at the forefront coordinate to be displayed is input.

Figure 6:
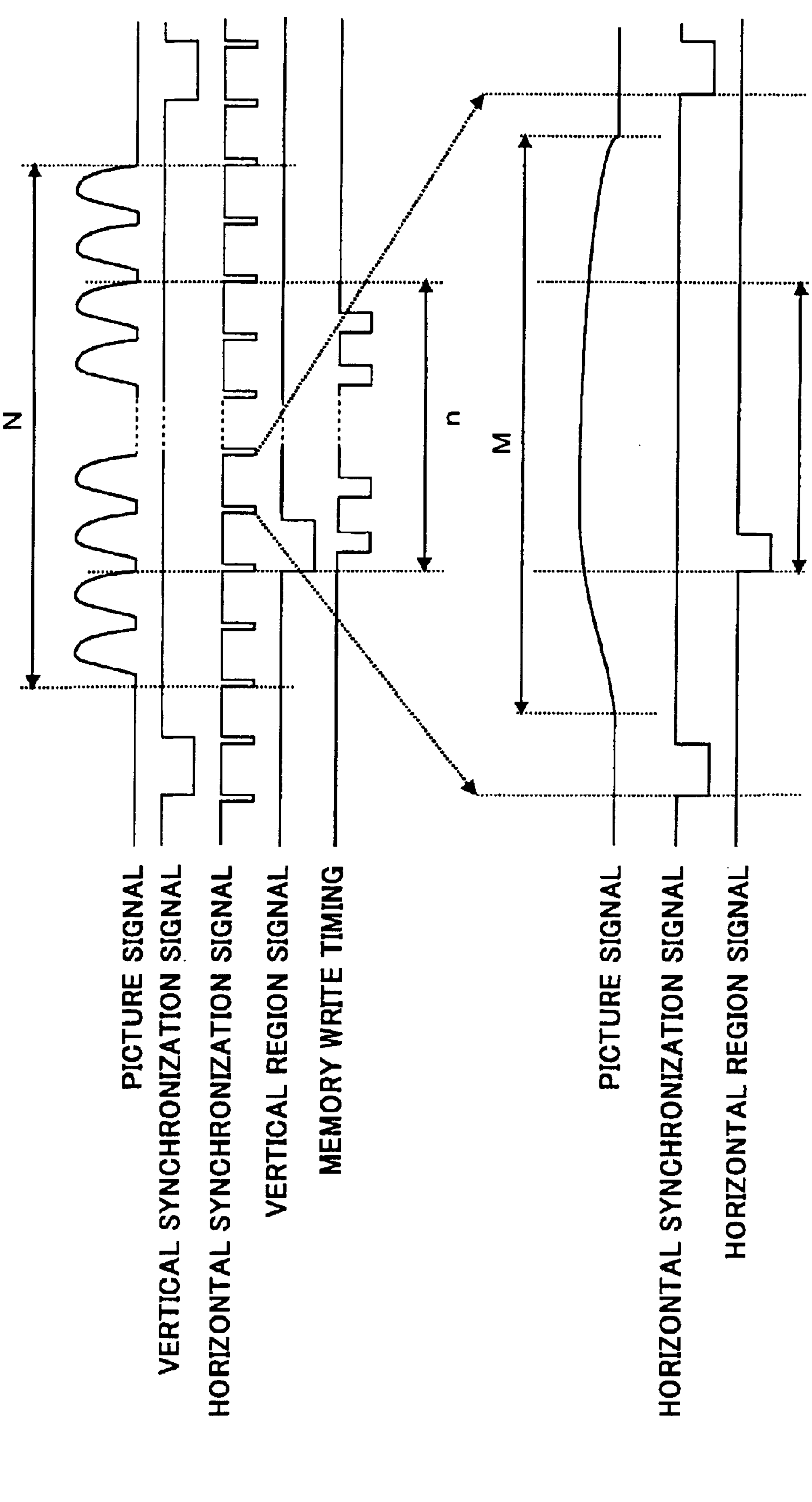
FIG. 6 is a diagram showing an example of signal timing of the display apparatus according to the aforesaid Embodiment.

In this case, as shown in FIG. 6, the memory 402 takes in "m" pixels of a picture signal after the horizontal region designation signal became effective, and then, the memory 402 does not take in any picture signal until the horizontal region designation signal becomes effective next time. In addition, the memory 402 takes in "n" lines of the picture signal after the vertical region designation signal became effective, and then the memory 402 does not take in any picture signal before the vertical region designation signal becomes effective next.

The adoption of such a configuration makes the pieces of information necessary for designation decrease.

Moreover, the region information input section 130 is composed of the vertical region input terminal 132 and the horizontal region input terminal 131, and the horizontal display position information and the vertical display position information are separately input, but, the configuration of the region information input section 130 is not limited to such a configuration. That is, the region information input section 130 may be configured with an information input terminal of one system, and a piece of code information including both of the horizontal display position information and the vertical display position information may be adopted. The adoption of such a configuration makes it possible to decrease necessary lines.

Besides, the vertical region designation circuit 141 may be configured such that it autonomously generates a vertical region designation signal only by means of a vertical synchronization signal and a horizontal synchronization signal without using the vertical display position information input from the vertical region input terminal 132. In this case, instead of supplying the vertical display position information in the region information input section 130 to the vertical region designation circuit 141, the vertical coordinates of a region stored beforehand in the vertical region designation circuit 141 is output to the memory write control circuit 403.

The adoption of such a configuration makes it possible to display a picture without necessity of the designation of the vertical display position information from the outside.

Moreover, the horizontal region designation circuit 142 may be configured such that it autonomously generates a horizontal region designation signal only by means of a vertical synchronization signal and a horizontal synchronization signal without using the horizontal display position information input from the horizontal region input terminal 131. In this case, instead of supplying the horizontal display position information in the region information input section 130 to the horizontal region designation circuit 142, only the horizontal coordinates of a region stored beforehand in the horizontal region designation circuit 142 is output to the memory write control circuit 403.

The adoption of such a configuration makes it possible to display a picture without necessity of the designation of the horizontal display position information from the outside.

Moreover, it is also possible to change a position of a region designated by the vertical region designation signal generated by the vertical region designation circuit 141 at every frame continuously. In this case, a configuration such that the quantity of the change of a region position at every frame is also input into the vertical region designation circuit 141 from the region information input section 130 is adopted. The adoption of such a configuration makes it possible to scroll a picture displayed on the basis of a picture signal in a region equivalent to the resolution of the picture display surface 101 in the picture signal in the vertical direction.

Moreover, the position of a region designated by the horizontal region designation signal generated by the horizontal region designation circuit 142 can also be changed at every frame continuously. In this case, a configuration such that the quantity of the change of a region position at every frame is input into the horizontal region designation circuit 142 from the region information input section 130 is adopted. The adoption of such a configuration makes it possible to scroll a picture displayed on the basis of a picture signal in a region equivalent to the resolution of the picture display surf ace 101 in the picture signal in the horizontal direction.

(EMBODIMENT 3)

Figure 7:
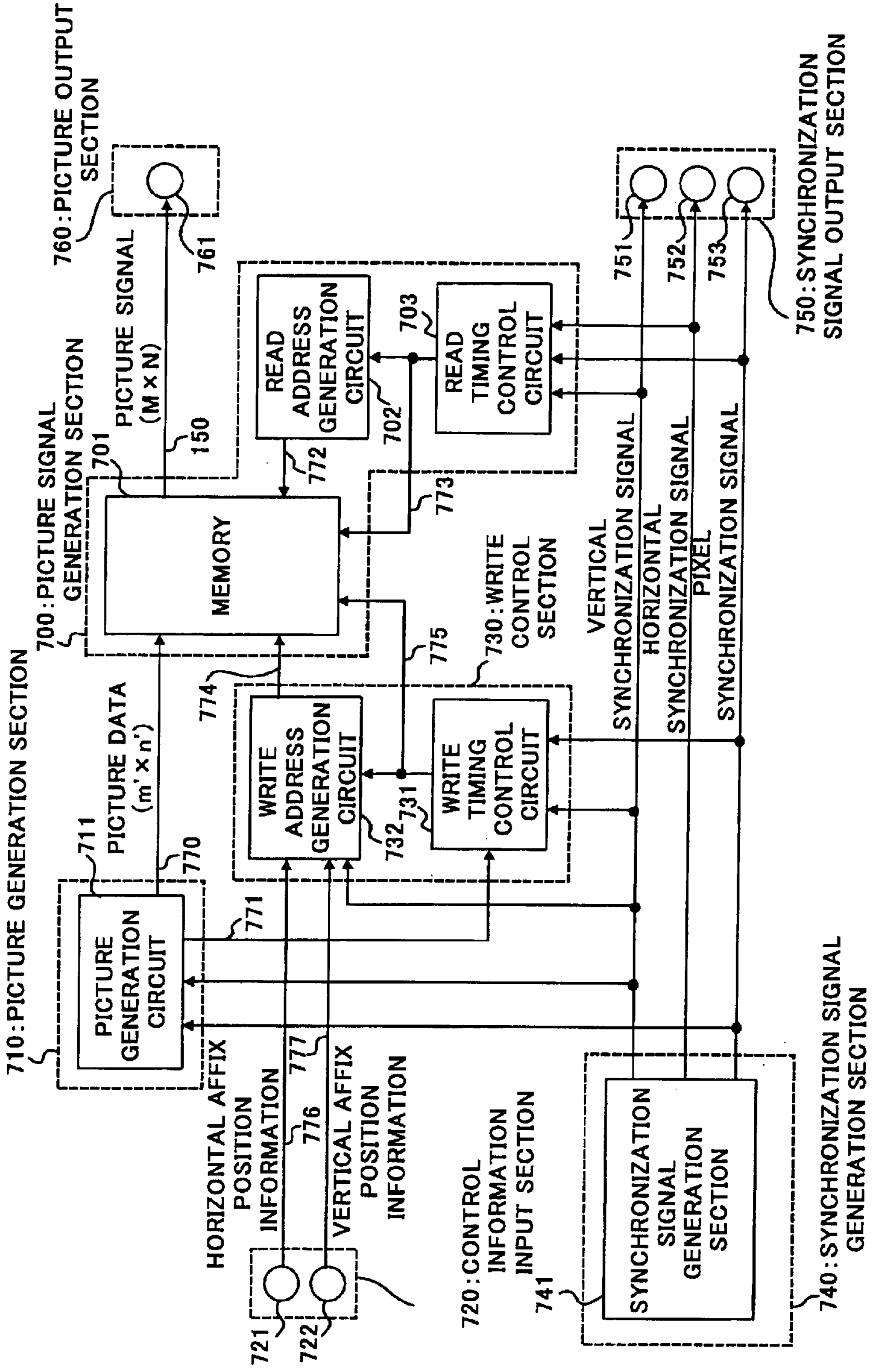
FIG. 7 is a block diagram showing the configuration of a picture generation apparatus according to Embodiment 3 of the present invention.

FIG. 7 is a block diagram showing the configuration of a picture generation apparatus according to Embodiment 3 of the present invention.

In FIG. 7, the picture generation apparatus of Embodiment 3 is chiefly composed of a picture signal generation section 700, a picture generation section 710, a control information input section 720, a write control section 730, a synchronization signal generation section 740, a synchronization signal output section 750 and a picture output section 760.

The picture signal generation section 700 is chiefly composed of a memory 701, a read address generation circuit 702 and a read timing control circuit 703. The picture generation section 710 has a picture generation circuit 711.

The control information input section 720 has a horizontal affix position input terminal 721 and a vertical affix position input terminal 722. The write control section 730 is chiefly composed of a write timing control circuit 731 and a write address generation circuit 732.

The synchronization signal generation section 740 has a synchronization signal generation circuit 741. The synchronization signal output section 750 has a pixel synchronization signal output terminal 753, a horizontal synchronization signal output terminal 752 and a vertical synchronization signal output terminal 751. The picture output section 760 has a picture signal output terminal 761.

Hereinafter, an example such that a picture data having a size of "m'" in the horizontal direction and "n'" in the vertical direction is affixed to a picture signal having a size of "M" (M>m') in the horizontal direction and "N" (N>n') in the vertical direction for being output is described.

The synchronization signal generation circuit 741 generates a horizontal synchronization signal, and the circuit 741 outputs the generated horizontal synchronization signal to the read timing control circuit 703 and the horizontal synchronization signal output terminal 752. Moreover, the synchronization signal generation circuit 741 generates a vertical synchronization signal, and the circuit 741 outputs the generated vertical synchronization signal to the picture generation circuit 711, the read timing control circuit 703, the write address generation circuit 732, the write timing control circuit 731 and the vertical synchronization signal output terminal 751. In addition, the synchronization signal generation circuit 741 generates a pixel synchronization signal, and the circuit 741 outputs the generated pixel synchronization signal to the picture generation circuit 711, the read timing control circuit 703, the write timing control circuit 731 and the pixel synchronization signal output terminal 753.

Incidentally, the horizontal synchronization signal is a signal giving a pulse having a fixed width at every output of data for one line of a picture signal, and the vertical synchronization signal is a signal giving a pulse having a fixed width at every output of one frame of a picture signal.

The picture generation circuit 711 generates picture data having the resolution of m'×n' synchronously with the timing of a vertical synchronization signal, and the circuit 711 outputs the generated picture data to the memory 701. Moreover, the picture generation circuit 711 generates a horizontal synchronization signal synchronously with the output timing of the picture data having the resolution of m'×n', and the circuit 711 outputs the generated horizontal synchronization signal to the write timing control circuit 731.

The write timing control circuit 731 generates a write timing signal, and the circuit 731 outputs the generated write timing signal to the write address generation circuit 732 and the memory 701 synchronously with the timing of a pixel synchronization signal.

The write address generation circuit 732 determines a region, to which picture data are written, in the memory 701 having a space of M×N on the basis of the horizontal affix position information input from the horizontal affix position input terminal 721 and the vertical affix position information input from the vertical affix position input terminal 722, and the write address generation circuit 732 generates the addresses of the region to output them to the memory 701 in synchronization with a write timing signal output from the write timing control circuit 731. Moreover, the write address generation circuit 732 resets a counter for the generation of write addresses at the period of a vertical synchronization signal.

The read timing control circuit 703 generates a read timing signal, and the circuit 703 outputs the generated read timing signal to the read address generation circuit 702 and the memory 701 synchronously with the timing of a pixel synchronization signal.

The read address generation circuit 702 outputs an address to the memory 701 synchronously with the timing of a read timing signal output from the read timing control circuit 703.

The memory 701 stores picture data output from the picture generation circuit 711 at an address output form the write address generation circuit 732 in timing with a write timing signal output from the write timing control circuit 731. In addition, the memory 701 outputs picture data stored at an address output from the memory read address generation circuit 702 to the picture signal output terminal 761 in timing with a read timing signal output from the read timing control circuit 703.

Besides, the memory 701 stores a plurality of frames of picture data therein, and the memory 701 outputs the picture data of the frame the writing to which has been completed.

The signal timing in the display apparatus of Embodiment 2 is described next.

Figure 8:
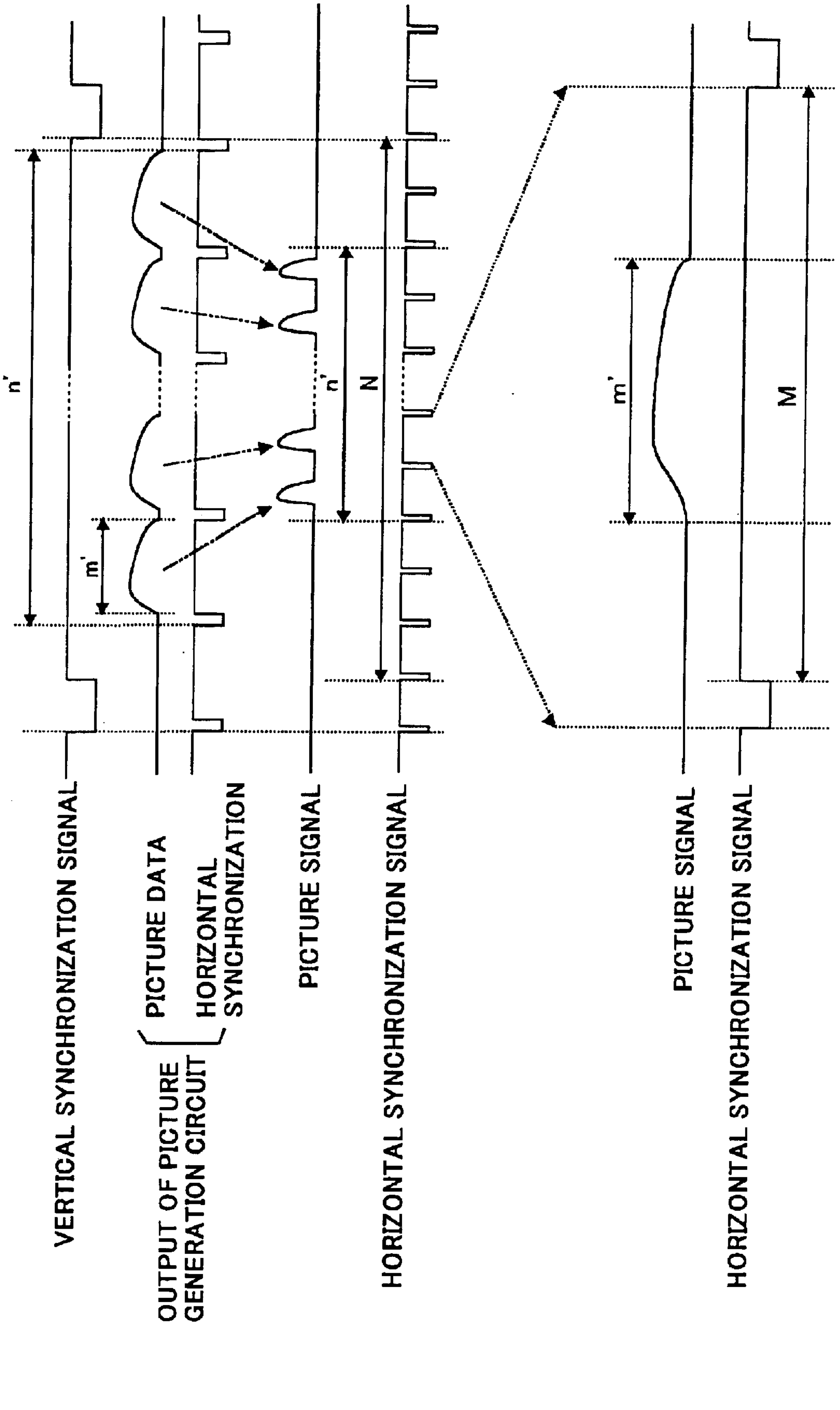
FIG. 8 is a diagram showing an example of signal timing of the display apparatus according to the aforesaid Embodiment.

FIG. 8 is a diagram showing an example of signal timing of the display apparatus according to the present embodiment. The abscissa axis in FIG. 8 indicates time.

A horizontal synchronization signal generated by the synchronization signal generation circuit 741 is a signal giving a pulse having a fixed width at every line of a picture signal, and the horizontal synchronization signal becomes effective for a period of time for the output of the picture signal for "M" pixels in the horizontal direction. In addition, a vertical synchronization signal generated by the synchronization signal generation circuit 741 is a signal giving a pulse having a fixed width at every frame of a picture signal, and the vertical synchronization signal becomes effective for a period of time for the output of the "N" lines of the picture signal for "M" pixels in the horizontal direction.

m'×n' picture data are output to the memory 701 in the period when a vertical synchronization signal is effective, and the picture data are stored in the memory 701.

After that, a picture signal consisting of M×N data including m'×n' picture data is output from the memory 701. As shown in the diagram, N lines of picture data are output in the vertical direction. The n' lines of the picture data in the N liens of the picture data are data output from the picture generation circuit 711, and, as the other picture data, picture data that are stored in the memory 701 and have predetermined values are output.

The m' picture data in the M picture data in the horizontal direction are data output from the picture generation circuit 711, and, as the other picture data, picture data that are stored in the memory 701 and have predetermined values are output.

As described above, according to the picture generation apparatus of Embodiment 3, picture data are stored in at addresses of coordinates, at which the picture data are affixed, in the memory, and the picture data are read out from the memory in the size to be supplied. Consequently, picture data having different sizes can be adjusted to a picture data having a predetermined size.

Incidentally, the picture generation apparatus of Embodiment 3 configures the control information input section 720 with the horizontal affix position input terminal 721 and the vertical affix position input terminal 722, and the vertical affix position information and the horizontal affix position information are input individually. However, the configuration of the control information input section 720 is not limited to the above configuration, but the control information input section 720 may merely be composed of an information input terminal of one system, and information input from the information input terminal may be code information indicating a predetermined picture affix position.

Moreover, the write address generation circuit 732 may be configured such that the write addresses generation circuit 732 autonomously generates write addresses by means of only a vertical synchronization signal and a memory write signal without using the information input from the vertical affix position input terminal 722 and the horizontal affix position input terminal 721.

In this case, a method in which vertical affix information or horizontal affix position information, both being output from the control information input section 720, is previously memorized in the write address generation circuit 732, or other methods is used. Otherwise, a configuration such that either of a horizontal picture affix position or a vertical picture affix position is determined on the basis of the information input from the control information input section 720 and the other picture affix position is autonomously determined may be adopted.

Moreover, a picture affix position designated by a write address generated by the write address generation circuit 732 does not change at every frame. However, the picture affix position may continuously be changed at every frame in the horizontal direction, the vertical direction, or both of the horizontal and the vertical directions.

In this case, a configuration such that the quantity of the change of a picture affix position at every frame is also input into the write address generation circuit 732 from the control information input section 720 is adopted. The adoption of such a configuration makes it possible to generate a picture signal in which the position of picture data having a resolution of m'×n' continuously moves in the resolution of M×N.

Moreover, a configuration such that the values of a picture signal in the regions except for picture data are output to be always a constant value may be adopted. The adoption of such a configuration makes the change of a picture signal output from the picture signal output terminal 761 the minimum, and an advantage that the consumption power of the apparatus can be reduced.

(EMBODIMENT 4)

Figure 9:
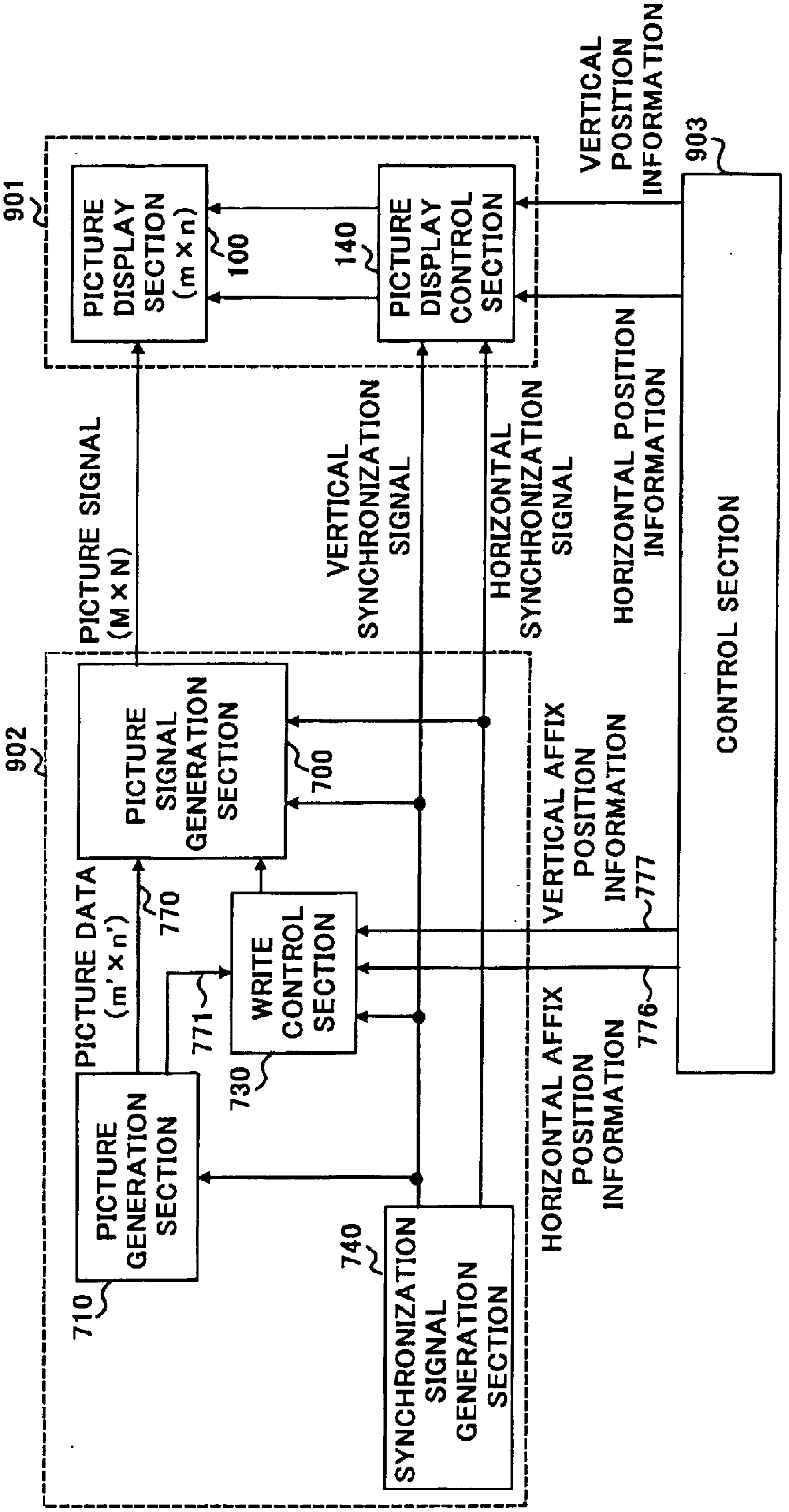
FIG. 9 is a block diagram showing the configuration of an electronic apparatus according to Embodiment 4 of the present invention.

FIG. 9 is a block diagram showing the configuration of an electronic apparatus according to Embodiment 4 of the present invention. Incidentally, elements having the same configurations as those of the elements shown in FIG. 1 or FIG. 7 are designated by the same reference numerals as those of FIG. 1 or FIG. 7, and the detailed descriptions concerning them are omitted.

In FIG. 9, the electronic apparatus of the present embodiment is chiefly composed of a display apparatus 901, picture generation apparatus 902 and a control section 903.

The display apparatus 901 comprises the display apparatus of Embodiment 1 or Embodiment 2. Besides, the picture generation apparatus 902 comprises the picture generation apparatus of Embodiment 3.

The control section 903 outputs a vertical direction position and a horizontal direction position of picture data generated by the picture generation section 710 at the time when the picture data are inserted into a picture signal output from the picture signal generation section 700 as the horizontal affix position information and the vertical affix position information, respectively, to the write control section 730.

Moreover, the control section 903 outputs a vertical direction position and a horizontal direction position at the time when a picture is displayed on the picture display surface 101 to the picture display control section 140 as horizontal position information and vertical position information, respectively. As described above, the controls section 903 monistically manages a position where a generated picture is inserted and a display position of the picture.

Next, the operation of the electronic apparatus according to the present embodiment is described.

Horizontal affix position information and vertical affix position information are output from the control section 903 to the picture generation apparatus 902, and a picture data of m'×n' is incorporated into a picture signal of M×N on the basis of these of the output horizontal affix information and the output vertical affix position information, and then the picture signal is output to the display apparatus 901.

Horizontal position information and vertical position information are output from the control section 903 to the display apparatus 901, and the picture data in a part of m×n of the picture signal of M×N are displayed on the basis of these pieces of information.

The adoption of such a configuration makes the control section 903 manage monistically to designate a position from which the display apparatus 901 cuts out picture data from a picture signal and a position at which the display apparatus 901 affixes picture data to a picture signal, and thereby the electronic apparatus can easily manage a position at which picture data generated by the picture generation section 710 of the picture generation apparatus 902 are displayed in the picture display surface 101 of the display apparatus 901.

For example, a description is given to an example in which there solution of a picture signal that is generated by the picture signal generation section 700 and is input into the picture display section 100 is CIF (352 pixels in the horizontal direction×288 pixels in the vertical direction) and the resolution of the picture display surface 101 is QCIF (176 pixels in the horizontal direction×144 pixels in the vertical direction).

When the resolution of picture data generated by the picture generation section 710 is QCIF, because the control section 903 monistically manages a position at which a picture data is affixed in a picture signal in the picture generation apparatus 902 and a position at which a region equivalent to the resolution of the picture display surface 101 is cutout from a picture signal in the display apparatus 901 and thereby the control section 903 can make the aforesaid two positions agree with each other, generated picture data can correctly be displayed in the display apparatus 901 even if the generated picture data have a size different from that of a picture signal to be supplied.

Moreover, when the resolution of a picture data generated by the picture generation section 710 is smaller than QCIF, the picture data can be displayed at the center of the picture display surface 101.

Besides, even if the resolution of a picture data generated by the picture generation section 710 is larger than QCIF and it is smaller than CIF, the control section 903 monistically manages the positions and can display the central part of the picture data on the picture display surface.

As described above, the electronic apparatus of the resent embodiment correlates the position where a generated picture is affixed with the position where the picture is displayed, and thereby even if the size of a picture to be generated, the size of a picture signal to be supplied to the display apparatus and the size of a picture to be displayed are different from each other, the electronic apparatus can display the picture.

Moreover, as described above, even if the resolution of a generated picture data variously changes, the electronic apparatus of Embodiment 4 can display the picture data.

Moreover, even if the resolutions of the picture display surfaces 101 of the display apparatus 901 are variously different, the electric apparatus can be configured without changing the picture generation apparatus 902 and the control section 903 at all provided that only the resolutions of picture signals input into the display apparatus 901 are the same.

In addition, although the present embodiment is described by the exemplifying of the display apparatus according to Embodiment 1, similar advantages can be obtained even if the display apparatus according to Embodiment 2 is used.

Moreover, although horizontal affix position information and vertical affix position information are supplied from the control section 903 to the picture generation apparatus 902, the picture generation apparatus may be configured such that it autonomously determines these pieces of information.

In this case, the same advantages that are described above can be obtained by the determining of the horizontal affix position and the vertical affix position by autonomous means similar to the picture generation apparatus 902 also in the inside of the control section 903. In this case, the signal lines for the horizontal affix position information and the vertical affix position information, both to be supplied to the picture generation apparatus 902 from the control section 903, become needless.

Moreover, although horizontal display position information and vertical display position information are supplied from the control section 903 to the display apparatus 901, the display apparatus 901 may be configured so as to determine these pieces of information autonomously.

In this case, the advantages similar to those described above can be obtained by the determination of a horizontal display position and a vertical display position by means of autonomous means similar to the display apparatus 901 also in the inside of the control section 903. In this case, the signal lines for the horizontal display position information and the vertical display position information, both to be supplied to the display apparatus 901 from the control section 903, become needless.

(EMBODIMENT 5)

Figure 10:
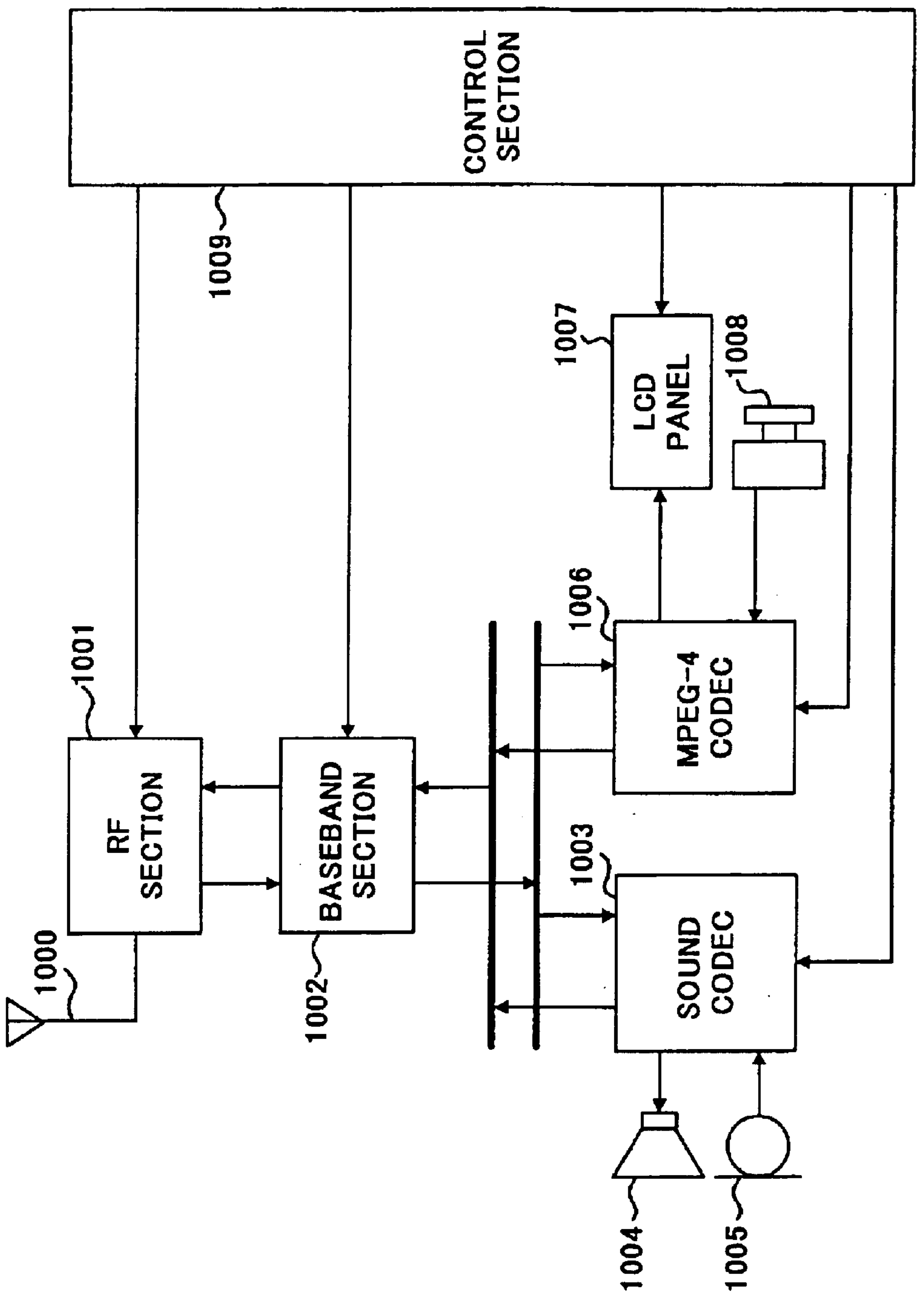
FIG. 10 is a block diagram showing the configuration of a communication apparatus according to Embodiment 5 of the present invention.

FIG. 10 is a block diagram showing the configuration of a communication apparatus according to Embodiment 5 of the present invention.

In FIG. 10, the communication apparatus is chiefly composed of an antenna 1000, an RF section 1001, a baseband signal processing section 1002, a sound codec 1003, a receiver 1004, a microphone 1005, an MPEG-4 codec 1006 being a picture generation apparatus 902, an LCD panel 1007 being a display apparatus 901, a camera 1008 and a control section 1009.

The antenna 1000 receives a radio signal, and the antenna 1000 outputs the received radio signal to the RF section 1001 as a reception signal. Besides, the antenna 1000 transmits a transmission signal output from the RF section 1001 in a form of a radio signal.

The RF section 1001 converts a reception signal output from the antenna 1000 to a baseband frequency, and the RF section 1001 outputs the converted reception signal to the baseband signal processing section 1002. Moreover, the RF section 1001 converts a transmission signal output from the baseband signal processing section 1002 to a radio frequency, and the RF section 1001 outputs the converted transmission signal to the antenna 1000.

The baseband signal processing section 1002 demodulates a reception signal to output the obtained sound it stream signal to the sound codec 1003, and the baseband signal processing section 1002 also outputs the obtained picture bit stream signal to the MPEG-4 codec 1006. Furthermore, the baseband signal processing section 1002 multiplexes a sound bit stream signal output from the sound codec 1003 and a picture bit stream signal output from the MPEG-4 codec 1006, and the baseband signal processing section 1002 modulates the multiplexed signal to output the modulated signal to the baseband signal processing section 1002 as a transmission signal.

The sound codec 1003 decodes a sound bit stream signal output from the baseband signal processing section 1002 to output the decoded sound bit stream signal to the receiver 1004. The sound codec 1003 also codes a sound signal input from the microphone 1005 to output the coded sound signal to the baseband signal processing section 1002.

The receiver 1004 outputs the sound signal output from the sound codec 1003 as a sound. The microphone 1005 converts an input sound into a sound signal to output the converted sound signal to the sound codec 1003.

The MPEG-4 codec 1006 comprises the picture signal generation section 700 of Embodiment 3, and the MPEG-4 codec 1006 decodes a picture bit stream signal output from the baseband signal processing section 1002. The MPEG-4 codec 1006 transforms the picture size of the decoded picture data into a picture signal in accordance with the resolution of the LCD panel 1007, and the MPEG-4 codec 1006 outputs the transformed picture signal to the LCD panel 1007.

In addition, the MPEG-4 codec 1006 codes picture data output from the camera 1008 to output the obtained picture bit stream signal to the baseband signal processing section 1002.

The LCD panel 1007 comprises the picture display control section 140 of Embodiment 1 or the picture display control section 400 of Embodiment 2, and the LCD panel 1007 displays a picture signal output from the MPEG-4 codec 1006. Moreover, the camera 1008 outputs a photographed picture to the MPEG-4 codec 1006 as picture data.

Next, the operation of the communication apparatus of the present embodiment at the time of the reception of a signal is described.

A signal received through the antenna 1000, the RF section 1001 and the baseband signal processing section 1002 is separated into a sound bit stream signal and a picture bit stream signal. And, the sound bit stream signal is output from the baseband signal processing section 1002 to the sound codec 1003. The picture bit stream signal is output from the baseband signal processing section 1002 to the MPEG-4 codec 1006.

The picture bitstream signal is decoded by the MPEG-4 codec 1006 as picture data. The picture data can have various resolutions. Then, the picture data are affixed into a picture signal having a predetermined resolution by the MPEG-4 codec 1006, and the picture data are output to the LCD panel 1007 as a picture signal having a fixed resolution.

Moreover, the LCD panel 1007 counts the number of the pixels of an input picture signal, and correlates the counted number with coordinates to extract only a part of the coordinates at which the picture data are displayed. Thereby, the LCD panel 1007 can display only the part capable of being displayed in the input picture signal.

As described above, the communication apparatus of the present embodiment transmits picture data having various resolutions that the MPEG-4 codec 1006 generates to the LCD panel 1007 as a picture signal having a fixed resolution, and the communication apparatus cuts out effective picture data from the picture signal with the LCD panel 1007. Thereby, the communication apparatus can display the effective picture data.

Incidentally, the display apparatus of the present invention can be used in a mobile station device in a mobile communication system such as a mobile telephone, a mobile visual telephone and a communication terminal having a computer function, or a stationary type telephone and a visual telephone, both being connected with wire circuits, and further a television receiver, a computer, an information terminal apparatus having a computer function, and other equipment.

As apparent from the above-mentioned descriptions, according to the display method and the picture generation method of the present invention, picture data of an arbitrary resolution can be displayed. In addition, picture data having a size larger than the display size of a display apparatus can be displayed.

This application is based on the Japanese Patent Application No. HEI 11-310111 filed on Oct. 29, 1999, entire content of which is expressly incorporated by reference herein.

What is claimed is:

1. An electronic apparatus comprising a picture generation apparatus and a picture display apparatus, said picture generation apparatus comprising:

a synchronization signal generator that generates a picture synchronization signal;

a picture generator that generates picture data in a horizontal resolution of m' and a vertical resolution of n' in synch with the picture synchronization signal;

a picture generation controller that specifies an m'×n' region in a memory, having a horizontal resolution of M (M>m') and a vertical resolution of N (N>n'), and stores the picture data in said region in synch with the picture synchronization signal; and a picture signal generator that reads data from the memory and generates a picture signal in the vertical resolution of N and horizontal resolution of M in synch with the picture synchronization signal, and said picture display apparatus comprising:

a picture display controller that specifies a displaying region on a picture display surface, having a horizontal resolution of m (M>m) and a vertical resolution of n (N>n); and a picture display that cuts from the picture signal a picture corresponding to the displaying region specified by the picture display controller and displays the picture on the picture display surface, wherein said electronic apparatus is further provided with a controller that controls the picture generation controller in the picture generation apparatus and the picture display controller in the picture display apparatus, and that independently controls a position of the region in the memory for storing the picture data and a position of the displaying region on the picture display surface of the picture display apparatus.

2. The electronic apparatus according to claim 1, wherein, when the resolution of the picture data generated in the picture generator (m'×n') and the resolution of the picture display (m×n) are equal, the picture generation controller and the picture display controller are controlled such that the position of the region in the memory for storing the picture data and the position of the displaying region on the picture display surface of the picture display apparatus match.

3. The electronic apparatus according to claim 1, wherein, when the resolution of the picture data generated in the picture generator (m'×n') is lower than the resolution of the picture display (m×n), the picture generation controller and the picture display controller are controlled such that the picture data is displayed in a center of the picture display apparatus.

4. The electronic apparatus according to claim 1, wherein, when the resolution of the picture data generated in the picture generator (m'×n') is greater than the resolution of the picture display (m×n), the picture generation controller and the picture display controller are controlled such that a middle portion of the picture data is displayed on the picture display surface.

5. A telephone apparatus comprising a picture generation apparatus and a picture display apparatus, said picture generation apparatus comprising:

a synchronization signal generator that generates a picture synchronization signal;

a picture generator that generates picture data in a horizontal resolution of m' and a vertical resolution of n' in synch with the picture synchronization signal;

a picture generation controller that specifies an m'×n' region in a memory, having a horizontal resolution of M (M>m') and a vertical resolution of N (N>n'), and stores the picture data in said region in synch with the picture synchronization signal; and a picture signal generator that reads data from the memory and generates a picture signal in the vertical resolution of N and horizontal resolution of M in synch with the picture synchronization signal, and said picture display apparatus comprising:

a picture display controller that specifies a displaying region on a picture display surface, having a horizontal resolution of m (M>m) and a vertical resolution of n (N>n); and a picture display that cuts from the picture signal a picture corresponding to the displaying region specified by the picture display controller and displays the picture on the picture display surface, wherein said electronic apparatus is further provided with a controller that controls the picture generation controller in the picture generation apparatus and the picture display controller in the picture display apparatus, and that independently controls a position of the region in the memory for storing the picture data and a position of the displaying region on the picture display surface of the picture display apparatus.

* * * * *